(12) United States Patent
Barklin et al.

(10) Patent No.: US 10,875,679 B2
(45) Date of Patent: Dec. 29, 2020

(54) TURNING STAND FOR A ROTOR HUB OF A WIND TURBINE AND METHOD FOR TURNING THE ROTOR HUB

(71) Applicant: Vestas Wind Systems A/S, Aarhus N. (DK)

(72) Inventors: Per Larsen Barklin, Arhus N. (DK); Gunnar K. Storgaard Pedersen, Skjern (DK); Aksel Petersen, Rinkøbing (DK); Kurt Jensen, Arhus N. (DK)

(73) Assignee: Vestas Wind Systems A/S, Aarhus (DK)

( * ) Notice: Subject to any disclaimer, the term of this patent is extended or adjusted under 35 U.S.C. 154(b) by 692 days.

(21) Appl. No.: 14/916,364

(22) PCT Filed: Aug. 28, 2014

(86) PCT No.: PCT/DK2014/050254
§ 371 (c)(1),
(2) Date: Mar. 3, 2016

(87) PCT Pub. No.: WO2015/032407
PCT Pub. Date: Mar. 12, 2015

(65) Prior Publication Data
US 2016/0194109 A1    Jul. 7, 2016

(30) Foreign Application Priority Data
Sep. 3, 2013    (DK) ................................ 2013 70493

(51) Int. Cl.
*B65D 19/00*    (2006.01)
*B66C 13/08*    (2006.01)
(Continued)

(52) U.S. Cl.
CPC .......... *B65D 19/0002* (2013.01); *B66C 1/108* (2013.01); *B66C 13/08* (2013.01);
(Continued)

(58) Field of Classification Search
CPC .......... F03D 13/10; F03D 13/40; F03D 13/20; F03D 1/069; B65D 19/0002; E04H 12/34;
(Continued)

(56) References Cited

U.S. PATENT DOCUMENTS 1,399,641 A * 12/1921 Mize et al. ............. B25B 5/006
248/143
1,716,281 A * 6/1929 Pavey .................... B65G 65/24
248/143
(Continued)

FOREIGN PATENT DOCUMENTS

CA    2860522 A1 * 8/2013 ............. B66C 1/108
CN    101966965 A    2/2011
(Continued)

OTHER PUBLICATIONS

Danish Patent and Trademark Office, Search Report issued in Application No. PA 2013 70493 dated Apr. 14, 2014.
(Continued)

*Primary Examiner* — Jonathan Liu
*Assistant Examiner* — Taylor L Morris
(74) *Attorney, Agent, or Firm* — Wood Herron & Evans LLP (57) ABSTRACT

The invention provides a turning stand for turning a rotor hub from a position having its prospective axis of rotation oriented vertically to a position having its prospective axis of rotation oriented inclined or transversally to a vertical orientation. The turning stand comprises a base frame, a curved support frame and a second attachment structure for
(Continued)

attachment of a lifting device to the rotor hub. The base frame has a support plane and a first attachment structure for attachment to a rotor shaft link of a rotor hub, the support plane and the first attachment structure being arranged on opposite sides of the base frame. The curved support frame comprises a curved frame section and a straight frame section having a curved support surface section and a straight support surface section, respectively. The straight frame section with the straight support surface section is arranged laterally of the prospective axis of rotation of the rotor hub and the straight support surface section is angled to the prospective axis of rotation of the rotor hub by less than 15°. The curved frame section is connected between the base frame and the straight frame section such that the curved support surface section curves from the support plane to the straight support surface section. The second attachment structure is arranged laterally to the prospective axis of rotation of the rotor hub and is arranged on an opposite side of the position for the rotor hub with respect to the straight frame section. The invention further provides a method for turning a rotor hub from a position having its prospective axis of rotation oriented vertically to a position having its prospective axis of rotation oriented inclined or transversally to a vertical orientation. A rotor hub is provided in an inventive turning stand with a rotor shaft link of the rotor hub being attached to the first attachment structure. The second attachment structure is attached to the rotor hub. A lifting device is attached to the second attachment structure and lifts the second attachment structure, thereby rolling off the rotor hub on the curved support surface section until the prospective axis of rotation of the rotor hub is oriented in an angle with respect to ground corresponding to the angle of the axis of rotation of the rotor shaft with respect to ground.

12 Claims, 3 Drawing Sheets

(51) Int. Cl.
  *F03D 13/40* (2016.01)
  *F03D 13/10* (2016.01)
  *B66C 1/10* (2006.01)
(52) U.S. Cl.
  CPC ............. *F03D 13/10* (2016.05); *F03D 13/40* (2016.05); *F05B 2230/61* (2013.01); *Y02E 10/72* (2013.01); *Y02P 70/50* (2015.11)
(58) Field of Classification Search
  CPC .. F05B 2230/61; F05B 2230/60; B66C 1/108; B66C 13/08; B65G 7/08; B65G 47/252; B65G 7/00; B65G 65/24; Y02P 70/50
  USPC .................. 248/652, 664, 671, 676; 52/116; 414/778
  See application file for complete search history.

(56) References Cited

U.S. PATENT DOCUMENTS

| | | | | |
|---|---|---|---|---|
| 1,914,656 | A * | 6/1933 | Walker | B65G 7/08 248/143 |
| 2,199,897 | A * | 5/1940 | Stringer | E04H 12/187 116/173 |
| 2,251,731 | A * | 8/1941 | Daniels | B65G 7/08 414/572 |
| 2,439,581 | A * | 4/1948 | Robins | B62B 1/264 248/143 |
| 2,862,629 | A * | 12/1958 | Aberle | B65H 15/02 414/742 |
| 3,022,995 | A * | 2/1962 | Sorenson | D06F 39/001 248/143 |
| 3,367,448 | A * | 2/1968 | Wille | B66B 9/16 187/243 |
| 3,620,395 | A * | 11/1971 | Farmer, Sr. | B66F 19/00 254/94 |
| 3,674,252 | A * | 7/1972 | Crabtree | B65G 7/08 269/55 |
| 3,702,660 | A * | 11/1972 | Berger | B65G 7/08 414/778 |
| 3,863,775 | A * | 2/1975 | Toback | B65G 7/08 414/771 |
| 4,315,711 | A * | 2/1982 | Koscho | B65G 65/24 211/49.1 |
| 4,594,048 | A * | 6/1986 | Sipla | B66F 7/22 269/55 |
| 4,718,813 | A * | 1/1988 | Kehlenbach | B65H 49/38 414/469 |
| 4,971,286 | A * | 11/1990 | Silhan | B25H 1/0007 248/129 |
| 5,238,361 | A * | 8/1993 | Liqui | B66F 7/22 414/678 |
| 5,456,434 | A * | 10/1995 | Lomauro | B25H 1/0007 248/176.3 |
| 5,645,389 | A * | 7/1997 | Lilja | B65D 85/68 206/319 |
| 5,649,491 | A * | 7/1997 | Zaguroli, Jr. | B65G 7/08 108/7 |
| 5,924,832 | A * | 7/1999 | Rice | E04H 12/34 135/908 |
| 5,947,665 | A * | 9/1999 | Baur | B60P 7/08 280/405.1 |
| 6,443,688 | B1 * | 9/2002 | Komdeur | B65G 7/08 280/47.12 |
| 6,505,785 | B2 * | 1/2003 | Willis | E02D 27/42 290/55 |
| 7,303,365 | B2 * | 12/2007 | Wobben | B60P 3/40 280/404 |
| 7,634,890 | B2 * | 12/2009 | Maj | E04H 12/34 414/10 |
| 7,874,805 | B2 * | 1/2011 | Pedersen | B66C 3/00 416/204 R |
| 8,128,106 | B2 * | 3/2012 | Hollins | B62B 1/14 280/47.24 |
| 8,177,472 | B2 * | 5/2012 | Charlier | B62D 65/02 414/778 |
| 8,336,465 | B2 * | 12/2012 | Poulsen | B65D 19/0095 108/55.1 |
| 8,336,846 | B2 * | 12/2012 | Fernley | F16M 1/04 123/195 R |
| 8,528,735 | B2 * | 9/2013 | Nies | B66C 1/108 206/521 |
| 8,961,085 | B2 * | 2/2015 | Ressel | B60P 3/40 410/44 |
| 9,932,201 | B2 * | 4/2018 | Reichert | B65H 49/38 |
| 2004/0056493 | A1 * | 3/2004 | Vanagan | B66C 1/105 294/67.21 |
| 2008/0296903 | A1 * | 12/2008 | Todorof | H02K 21/145 290/55 |
| 2009/0159549 | A1 * | 6/2009 | Trede | B66C 1/108 212/270 |
| 2010/0181768 | A1 * | 7/2010 | Lavaur | F03D 13/10 290/44 |
| 2010/0252977 | A1 * | 10/2010 | Jorgensen | F03D 13/40 269/287 |
| 2010/0290918 | A1 | 11/2010 | Pedersen | |
| 2011/0220538 | A1 | 9/2011 | Nies | |
| 2012/0032125 | A1 * | 2/2012 | Diaz De Corcuera | B66C 1/108 254/131 |
| 2012/0171007 | A1 * | 7/2012 | Poulsen | B60P 3/40 414/800 |
| 2012/0201636 | A1 * | 8/2012 | Pedersen | B60P 3/40 414/539 |

(56) References Cited

U.S. PATENT DOCUMENTS

| | | | | |
|---|---|---|---|---|
| 2012/0328442 A1* | 12/2012 | Davis | ................... | B66C 23/185 |
| | | | | 416/204 R |
| 2013/0269188 A1* | 10/2013 | Falkenberg | ........... | F03D 7/0224 |
| | | | | 29/889.1 |
| 2013/0315685 A1* | 11/2013 | Pedersen | ................... | B60P 3/40 |
| | | | | 410/44 |
| 2014/0173898 A1* | 6/2014 | Poulsen | ................... | B60P 1/04 |
| | | | | 29/889.2 |
| 2014/0193255 A1* | 7/2014 | Hancock | ................ | F03D 7/022 |
| | | | | 416/1 |
| 2014/0259669 A1* | 9/2014 | Busbey | ................ | F03D 1/0675 |
| | | | | 29/889.71 |
| 2014/0373353 A1* | 12/2014 | Westergaard | ........... | F03D 80/70 |
| | | | | 29/889 |
| 2017/0370346 A1* | 12/2017 | Botwright | ............... | B63B 25/00 |
| 2019/0003459 A1* | 1/2019 | Meyer | ................... | F03D 13/10 |

FOREIGN PATENT DOCUMENTS

| | | | | | |
|---|---|---|---|---|---|
| CN | 102762849 | A | | 10/2012 | |
| DE | 29918183 | U1 | * | 3/2000 | ............... B65G 7/08 |
| DE | 102007038047 | A1 | * | 2/2009 | ........... E04G 21/167 |
| DE | 102012201088 | A1 | | 7/2013 | |
| EP | 2653716 | A1 | | 10/2013 | |
| FR | 2904300 | A1 | * | 2/2008 | ................ B65G 7/08 |
| GB | 376029 | A | * | 7/1932 | ............ B65G 65/24 |
| WO | 2008089763 | A2 | | 7/2008 | |
| WO | 2013110417 | A1 | | 8/2013 | |

OTHER PUBLICATIONS

European Patent Office, International Search Report issued in International Application No. PCT/DK2014/050254 dated Nov. 19, 2014.

China National Intellectual Property Administration, First Notification of Office Action in CN Application No. 201480060138.9, dated Dec. 28, 2016.

* cited by examiner

Fig. 1

TURNING STAND FOR A ROTOR HUB OF A WIND TURBINE AND METHOD FOR TURNING THE ROTOR HUB

BACKGROUND OF THE INVENTION

The present invention is directed to a turning stand for a rotor hub of a wind turbine and a method for turning a rotor hub from a transport position to a position oriented in preparation for attachment to a rotor shaft of a wind turbine.

DESCRIPTION OF THE RELATED ART

Figure 1:
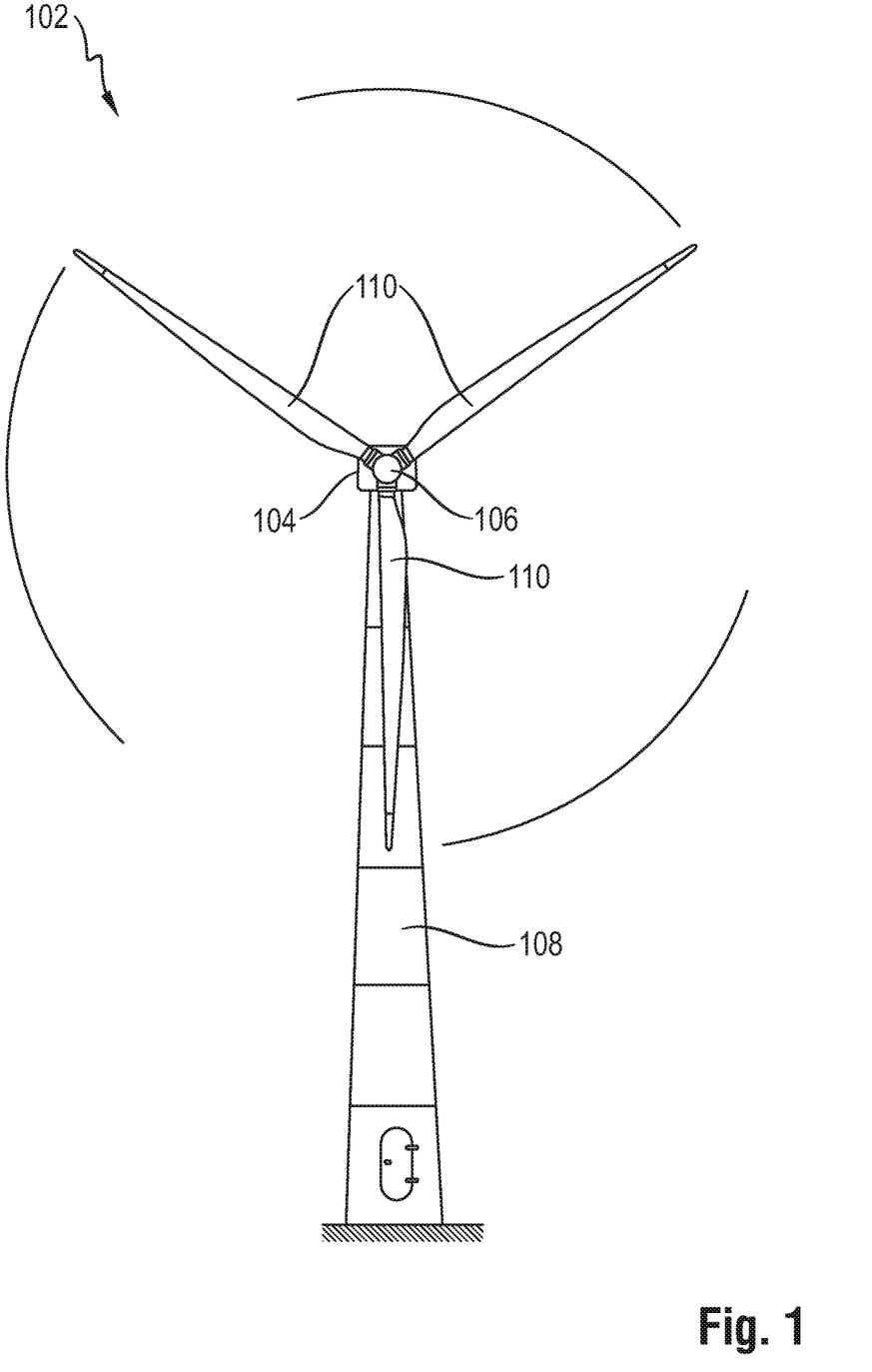
FIG. 1 illustrates a large modern wind turbine according to the state of the art, as seen from the front.

A wind turbine as known in the art comprises a tapered wind turbine tower and a wind turbine nacelle positioned on top of the tower. A wind turbine rotor with a number of rotor blades is connected to the nacelle by means of a rotor hub carried by a rotor shaft, which extends out of the nacelle front. An exemplary wind turbine in a horizontal axis wind turbine configuration is illustrated in FIG. 1.

A radius of the rotor influences the performance of the wind turbine. For example, a wind turbine with an increased radius may deliver power even in lighter wind conditions. Likewise, a wind turbine with an increased radius may deliver more power than a given wind turbine at any given wind. The radius of the rotor is essentially determined by the length of the rotor blades. Hence, the rotor blades of recently erected wind turbines have become longer and longer. However, even though light weight materials and structures are used, the blades get heavier with length and gain not only in leverage, but also in centrifugal force. The weight, leverage and centrifugal force of the rotor blades are received by the rotor hub. During operation, the rotor hub receives additionally the increased torque from the ever longer rotor blades and translates the torques into a rotation. The rotor hub is adapted to transmit all these loads to the rotor shaft.

Thus, the rotor hub provides massive structures to connect the rotor hub to the rotor blades and to the rotor shaft, and thereby rigidly connects the rotor blades to the rotor shaft. The massive structures comprise structures such as blade bearings and a rotor shaft link adapted to provide attachment structures for the rotor blades and the rotor shaft, respectively, to the rotor hub, as well as structures transmitting the loads from the rotor blades to the rotor shaft. The attachment structures are designed to allow instant attachment of the rotor hub to the rotor shaft. The attachment structures are also designed to allow assembling the rotor on the erection site of the wind turbine after transport of the detached rotor parts and particularly with the rotor hub attached to the rotor shaft before assembly of the rotor.

The rotor hub also comprises control gear to adjust the rotor blades in order to harvest an optimum in energy over a wide range of wind conditions and directions or to operate the wind turbine in any desired mode. Particularly, the rotor hub may contain rotor blade pitch control gear drives for common and for individual blade pitch adjustment. Adjustment of the rotor blades implies that the rotor hub not only contains structures holding the rotor blades, but also allowing rotation of the rotor blades about a respective length axis of each rotor blade.

Therefore, the rotor hub is a particularly heavy structure which gets heavier with the size of a wind turbine and particularly its radius. The rotor hub also requires to be handled with great care. Should the rotor hub be damaged and receive an imbalance during handling, the rotor shaft bearing might receive additional imbalanced loads leading to additional wear. In some cases of damage an optimal operation of the wind turbine is to be sacrificed to maintain a projected lifespan of the wind turbine plant and its components.

With the rotor hub being a rather heavy structure, it may not be allowed to move, to turn, or—suspended from a crane—to swing in a somewhat uncontrolled manner, as it may damage surrounding objects and harm bystanding operators.

Also, the rotor hub should not be supported on any arbitrary section of its outer surface, but should preferably be arranged to bear on one of its attachment structures, preferably on the rotor shaft link. Usually, the rotor hub will be stored and transported with the rotor shaft link facing downwards and resting on some kind of dedicated support structure.

In the following, the position of the rotor hub with the rotor shaft link facing downwards will be referred to as "transport position". In this position a prospective axis of rotation of the rotor hub, i.e., the axis about which the rotor hub will rotate during operation at the wind turbine, extends vertically with respect to ground.

To bring the rotor hub from the transport position into an orientation for installation, the rotor hub is to be turned such that the prospective axis of rotation is in parallel to the axis of rotation of the rotor shaft. In some embodiments, in this position the prospective axis of rotation is oriented inclined or transversally to a vertical orientation. Particularly in horizontal axis wind turbines, the prospective axis of rotation in the orientation for installation extends essentially parallel with respect to ground, i.e., parallel or tilted by some degrees with respect to ground as it is common in the art. In the following, the term "ground" shall mean a plane with a normal vector collinear to a gravity vector.

However, if simply one side of the rotor hub is lifted in order to tilt the rotor hub, the rotor hub would be supported only by the lifting attachment and some point on a side of the rotor hub opposite to the lifting attachment. This will be an instable condition if a centre of gravity of the rotor hub lies above a connecting line between these two support points. Hence, the rotor hub could topple to the side and possibly start swinging around when suspended from a crane. The swinging around is potentially dangerous and can be difficult to be controlled. Further, such swinging around of the rotor hub suspended from a crane needs to be attenuated before attempting to attach the rotor hub to the rotor shaft.

In the past, a rotor hub has been attached with one or more rotor blades and the rotor blade has been used as a lever to allow slow turning of the rotor hub while the rotor hub is lifted into its final position. However, this method requires coordination of two cranes at the same time, one to control and lift the rotor hub and one to control and lift the rotor blade.

EP 2 226 496 A2 refers to adjusting an orientation of parts for installation on a wind turbine, e.g. adjusting an orientation of a blade bearing for installation. To this end a lifting device has an inverse U-shaped carrying frame holding a tilting frame between its lateral arms.

EP 2 434 141 A1 discloses that during manufacture of a wind turbine, components are mounted on both sides of a yaw bedplate. To this end, the bedplate may be flipped over.

Particularly, the bedplate is installed in a yaw turning apparatus having a lifting device and a turning device. The turning device may turn the bedplate after the lifting device has lifted the bedplate.

It is therefore an object of the present invention to provide for controlled turning of a rotor hub from an orientation having a rotor shaft link facing downwards to an orientation having a prospective axis of rotation oriented in preparation for attachment to a rotor shaft of a wind turbine.

SUMMARY OF THE INVENTION

While the invention is defined in the independent claims, further aspects of the invention are set forth in the dependent claims, the following description and the drawings.

According to a first aspect, the invention provides a turning stand for turning a rotor hub from a transport position to a position oriented in preparation for attachment to a rotor shaft of a wind turbine. The turning stand comprises a base frame having a support plane and a first attachment structure for attachment to a rotor shaft link of a rotor hub, the first attachment structure being arranged to be aligned to a prospective axis of rotation of the rotor hub and the support plane being arranged to extend perpendicularly to the prospective axis of rotation of the rotor hub; a curved support frame comprising a curved frame section and a straight frame section having a curved support surface section and a straight support surface section, respectively; and a second attachment structure for attachment of a lifting device to the rotor hub; wherein the straight frame section with the straight support surface section is arranged to be lateral of the prospective axis of rotation of the rotor hub and the straight support surface section is oriented in a non-zero angle to the support plane; the curved frame section is connected between the base frame and the straight frame section, such that the curved support surface section curves from the support plane to the straight support surface section; and the second attachment structure is adapted to be arranged laterally to the prospective axis of rotation of the rotor hub and is adapted to be arranged on an opposite side of the position for the rotor hub with respect to the straight frame section.

Preferably, the support plane and the first attachment structure are arranged on opposite sides of the base frame.

Preferably, the straight support surface section is arranged to be oriented such that when the rotor hub is turned to the position having the prospective axis of rotation oriented inclined or transversally to the vertical orientation, the straight support surface section is horizontal. Preferably, the straight support surface section is arranged to be angled to the prospective axis of rotation of the rotor hub to match the inclined or transversal orientation to the vertical orientation. Preferably, the straight support surface section is arranged to be angled to the prospective axis of rotation of the rotor hub to match a tilt angle of the rotor shaft. Preferably, the straight support surface section is arranged to be angled to the prospective axis of rotation of the rotor hub by less than 15°.

According to another aspect, the invention further provides a method for turning a hub from a transport position to a position oriented in preparation for attachment to a rotor shaft of a wind turbine. The method comprises providing a rotor hub in a turning stand according to the first aspect with a rotor shaft link of the rotor hub being attached to the first attachment structure, the turning stand and the rotor hub being in the transport position with the base frame below the rotor hub; attaching the second attachment structure to the rotor hub; attaching a lifting device to the second attachment structure; and lifting the second attachment structure, thereby rolling off the rotor hub on the curved support surface section until the prospective axis of rotation of the rotor hub is oriented in an angle with respect to ground corresponding to the angle of the axis of rotation of the rotor shaft with respect to ground.

BRIEF DESCRIPTION OF THE DRAWINGS

Embodiments of the present invention are explained by example with respect to the accompanying drawings, in which.

DETAILED DESCRIPTION OF EMBODIMENTS

FIG. 1 shows a wind turbine 102 with a nacelle 104, and a rotor hub 106 pivotally mounted to the nacelle 104 via a rotor shaft. The rotor shaft extends from the rotor hub 106 facing away from the viewer and is therefore not shown. The nacelle 104 is mounted on a wind turbine tower 108 via a rotary joint. The rotor hub 106 of the wind turbine includes three wind turbine blades 110 attached to the rotor hub 106. The rotor hub 106 is adapted to rotate about its axis of rotation, which is aligned to an axis of rotation of the rotor shaft, such that the rotor blades 110 sweep a rotational plane substantially perpendicular to the axes of rotation. The axes of rotation are essentially parallel with respect to ground, i.e., parallel or tilted by a tilt angle of some degrees with respect to ground, in some embodiments less than 15°, preferably less than 10°, in some embodiments 6°. The tilt angle is the angle of the axis of rotation of the rotor shaft of the wind turbine with respect to ground.

Before proceeding further with the detailed description of the embodiments of the invention, some general aspects of the turning stand are discussed. A turning stand for turning a rotor hub from a position having its prospective axis of rotation oriented vertically to a position having its prospective axis of rotation oriented inclined or transversally to a vertical orientation comprises a base frame having a support plane and a first attachment structure for attachment to a rotor shaft link of a rotor hub, the support plane and the first attachment structure being arranged on opposite sides of the base frame, the first attachment structure being aligned to a prospective axis of rotation of the rotor hub and the support plane extending perpendicularly to the prospective axis of rotation of the rotor hub. The turning stand further comprises a curved support frame comprising a curved frame section and a straight frame section having a curved support surface section and a straight support surface section, respectively, and a second attachment structure for attachment of a lifting device to the rotor hub. The straight frame section with the straight support surface section is arranged to be lateral of the prospective axis of rotation of the rotor hub. The straight support surface section is arranged to be angled to the prospective axis of rotation of the rotor hub to match the inclined or transversal orientation to the vertical orientation. The curved frame section is connected between the base frame and the straight frame section such that the curved support surface section curves from the support plane to the straight support surface section. The second attachment structure is arranged laterally to the prospective axis of rotation of the rotor hub and is arranged on an opposite side of the position for the rotor hub with respect to the straight frame section.

In some embodiments a position having its prospective axis of rotation oriented vertically corresponds to a transport position of the rotor hub. In some embodiments a position having its prospective axis of rotation oriented inclined or transversally to a vertical orientation corresponds to a position oriented in preparation for attachment to a rotor shaft of a wind turbine. In some embodiments an inclined or transversal orientation to the vertical orientation corresponds to a tilt angle of the rotor shaft.

In some embodiments the straight support surface section is arranged to be angled by less than 15°, preferably by less that 8° and most preferably by 6°.

In some embodiments the curved support surface section abuts flush with the support plane and the straight support surface section, respectively.

In some embodiments the turning stand further comprises an abutment structure for an auxiliary support frame, the abutment structure being arranged adjacent to the connection between the base frame and the curved frame section.

In some embodiments the second attachment structure is adapted to engage a blade bearing of the rotor hub.

In some embodiments the curved support surface section has a quarter circular shape.

In some embodiments the curved support frame has a first curved support surface section, a first straight support surface section, a second curved support surface section and a second straight support surface section, the first and second curved support surface sections abut the first and second straight support surface sections, respectively, the first curved support surface section and the first straight support surface section extend in parallel to the second curved support surface section and the second straight support surface section, respectively, and the first curved support surface section and the first straight support surface section are spaced apart from the second curved support surface section and the second straight support surface section, respectively.

In some embodiments the first curved support surface section and the first straight support surface section are spaced apart from the second curved support surface section and the second straight support surface section by the width of a side of the base frame, from which side the curved support frame extends.

In some embodiments the first and second straight support surface sections are connected by a transverse bar.

In some embodiments the second attachment structure comprises a lifting device attachment means, which is positioned, when attached to a rotor hub, such that a connecting line to the centre of gravity of the rotor hub is angled with respect to an orthogonal line to the prospective axis of rotation of the rotor hub by less than 15°, preferably by 6°.

In some embodiments the straight support surface section is oriented to the support plane by an angle equal to the sum of the tilt angle and a right angle.

A method for turning a rotor hub from a position having its prospective axis of rotation oriented vertically to a position having its prospective axis of rotation oriented inclined or transversally to a vertical orientation comprises providing a rotor hub in a turning stand according to any of the embodiments described above with a rotor shaft link of the rotor hub being attached to the first attachment structure, the turning stand and the rotor hub being in the transport position with the base frame below the rotor hub, attaching the second attachment structure to the rotor hub, attaching a lifting device to the second attachment structure and lifting the second attachment structure, thereby rolling off the rotor hub on the curved support surface section until the prospective axis of rotation of the rotor hub is oriented in an angle with respect to ground corresponding to the angle of the axis of rotation of the rotor shaft with respect to ground.

In some embodiments the method comprises placing the rotor hub on the turning stand, attaching the first attachment structure to the rotor shaft link of the rotor hub and transporting the rotor hub and the turning stand to an erection site of a wind turbine.

In some embodiments the method further comprises, after rolling off the rotor hub on the curved support surface, disposing an auxiliary support frame under the abutment structure of the base frame in order to prevent the turning stand from rolling back.

In some embodiments the method further comprises detaching the rotor hub from the base frame and lifting the rotor hub by means of the lifting device into an attachment position.

Figure 2A:
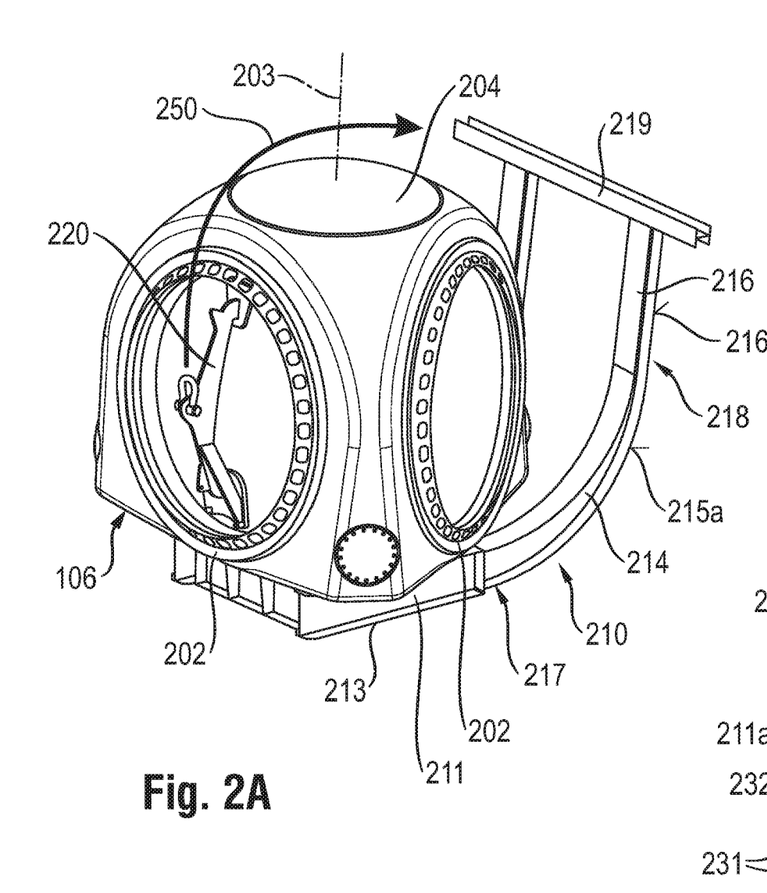
FIG. 2A shows a rotor hub attached to a turning stand according to the invention, the rotor hub being in a transport position.

FIG. 2A shows a rotor hub 106 mounted on a turning stand 210 in an initial position. The rotor hub 106 comprises a rotor shaft link 201 (see FIG. 2B) for attachment of the rotor hub 106 to a rotor shaft and at least one blade bearing 202 for attachment of a rotor blade 110. In the depicted embodiment the rotor hub 106 is oriented such that its prospective axis of rotation extends in a vertical direction with respect to ground, i.e., the prospective axis of rotation is collinear to a gravity vector. The prospective axis of rotation will be the axis of rotation of the rotor hub 106 after the rotor hub 106 is installed on the wind turbine 102 and attached to the rotor shaft. The rotor shaft link 201 faces downwards and is essentially arranged radially around the prospective axis of rotation 203. The rotor hub 106 further comprises a nose cone 204 facing upwards and being likewise arranged radially around the prospective axis of rotation 203. The nose cone 204 may be removed from the rotor hub 106 to allow access to the inside of the rotor hub 106 while installed on the wind turbine 102 without removing any of the wind turbine blades 110. The at least one blade bearing 202 is arranged such that a blade attached thereto extends perpendicularly to the prospective axis of rotation. In some embodiments, the blade bearing 202 is tilted with respect to the prospective axis of rotation 203 by several degrees, for example less than 10°. The rotor hub 106 connects the blade bearing 202 to the rotor shaft link 201 and is adapted to transmit torque from a turbine blade 110 to the rotor shaft.

The turning stand 210 comprises a base frame 211 and a curved support frame 214. In the depicted embodiment, the base frame 211 and the curved support frame 214 are formed by use of double-T-beams. The base frame 211 in the depicted embodiment has a flat shape. The base frame 211 is provided with a first attachment structure 212 for attachment of the rotor shaft link 201 and a support plane 213 on which the turning stand 210 rests on ground. In some embodiments, the support plane 213 is formed as an integral or multipiece flat support surface. The first attachment structure 212 and the support plane 213 are arranged on opposite sides of the base frame 211, such that the shortest dimension of the base frame 211 extends from the support plane 213 to the first attachment structure 212. In the depicted embodiment, the base frame 211 has an oblong shape and extends in two directions parallel to ground and is limited to the thickness of the double-T-beams comprised therein in a vertical direction. The support plane 213 is formed by the outside of the flanges of the double-T-beams on one side of the base frame 211. In alternative embodiments, the base frame has a triangular shape or a cross shape and the support plane is formed by discrete support points.

In the depicted embodiment, the curved support frame 214 comprises a curved frame section 215 and a straight frame section 216. The curved frame section 215 comprises a curved support surface section 215a and the straight frame section 216 comprises a straight support surface section 216a. At the respective interfaces, the curved support surface section 215a abuts flush to the support plane 213 of the base frame 211, and the straight support surface section 216a abuts flush to the curved support surface section 215a. In some embodiments the straight support surface section 216a is extremely short or only constitutes an end of the curved support surface section 215a.

With respect to the base frame 211, the curved support frame 214 comprises a proximate section 217 and a distal section 218, wherein the distal section 218 comprises the straight frame section 216.

In some embodiments, the angle of the straight support surface section 216a with respect to the prospective axis of rotation 203 of the rotor hub 106 corresponds to the tilt angle of the rotor shaft. Thus, if the rotor shaft extends parallel to ground, the straight support surface section 216a extends in parallel to the prospective axis of rotation 203 of the rotor hub 106. If the rotor shaft is somehow tilted by a certain angle with respect to ground, the straight support surface section 216a extends with the same or a similar angle with respect to the prospective axis of rotation 203 of the rotor hub 106.

In other embodiments the straight support surface section 216a is parallel to the prospective axis of rotation 203 of the rotor hub 106 even if the rotor shaft is somehow tilted by a certain angle with respect to ground.

As the support plane 213 of the base frame 211 extends perpendicularly to the prospective axis of rotation 203 of the rotor hub 106, the straight support surface section 216a is oriented to the support plane 213 by an angle equal to the sum of the tilt angle and a right angle.

The curved support surface section 215a curves from the support plane 213 facing downwards and extending essentially perpendicularly to the prospective axis of rotation 203 to an orientation of the straight support surface section 216a. In some embodiments the curved support surface section 215a has a quarter circular shape.

In the depicted embodiment, the curved support frame 214 has a first curved support surface section 215a, a first straight support surface section 216a, a second curved support surface section 215a and a second straight support surface section 216a. The first curved support surface section 215a and the first straight support surface section 216a extend in parallel to and are spaced apart from the second curved support surface section 215a and the second straight support surface section 216a, respectively. The spacing corresponds to the width of one side of the oblong base frame 211, from which side the curved support frame 214 extends.

In the distal section 218 the straight support surface sections 216a of the curved support frame 214 are connected by a transverse bar 219 at their outermost end. In an alternative embodiment (not shown) only one curved support surface section 215a and one straight support surface section 216 are provided and the transverse bar 219 is arranged in a T-shaped configuration on the outermost end of the straight support surface section 216a. In a further embodiment the transverse bar 219 intersects the straight frame section 216 along its length. In all of these embodiments the transverse bar 219 extends in parallel to the support plane 213.

In the depicted embodiment the base frame 211 and the curved support frame 214 are formed by double-T-beams. At the base frame 211 the double-T-beams may be welded or screwed together. To connect the base frame 211 and the curved support frame 214, two parallel double-T-beams of the base frame 211 are provided with flanges at one side, and likewise, the curved support frame 214 is provided with flanges at the end of the proximate section 217. The flanges of the base frame 211 and the curved support frame 214 are screwed together in the depicted embodiment. Alternatively they may be connected by any suitable means known in the art.

In some embodiments the transverse bar 219 is likewise welded to the straight frame section 216 at the distal section 218. The transverse bar is formed as double-T-beam or alternatively as a C-beam. In an embodiment, the surface at one side of the transverse bar 219 is arranged to be flush with the straight support surface section 216a. In some embodiments the straight support surface 216 is formed by the side of the transverse bar 219 and the distal end of the curved support surface section 215a.

In further embodiments, the curved support surface section is contracted to a sharp edge over which the rotor hub may be tilted, and the sharp edge is connected to the support plane 213 via a further straight surface section, or the curved surface section shaped as a sharp edge interfaces with the support plane 213.

Preferably, no portion of the rotor hub 106 installed on the turning stand 210 extends beyond the curved support surface section 215a and the straight support surface section 216a. Thereby the rotor hub 106 does not touch ground before, during or after rolling off.

The turning stand 210 further comprises a second attachment structure 220 for attachment of a lifting device to the rotor hub 106. The second attachment structure 220 is arranged laterally to the prospective axis of rotation 203 of the rotor hub 106 and is arranged on an opposite side of the prospective axis of rotation 203 with respect to the straight frame section 216 of the curved support frame 214. When lifting the second attachment structure 220, the rotor hub 106 and the turning stand 210 are supported not only by the lifting device, but also by the curved support frame 214 and rest on the curved support surface section 215a. During lifting the turning stand 210 and the rotor hub 106 roll off on the curved support surface section 215a, thereby turning the prospective axis of rotation 203 of the rotor hub 106 as indicated by arrow 250.

Figure 2B:
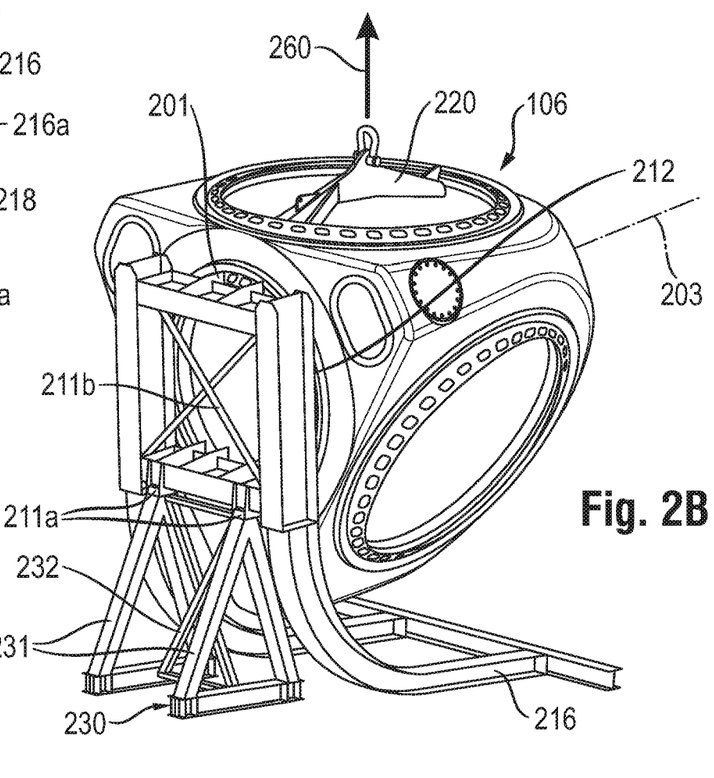
FIG. 2B shows a rotor hub attached to a turning stand according to the invention, the rotor hub being in a position oriented in preparation for attachment to a rotor shaft for a wind turbine.

FIG. 2B shows the turning stand 210 and the rotor hub 106 in a final position after rolling off. The prospective axis of rotation 203 of the rotor hub 106 has an orientation with respect to ground corresponding to the tilt angle of the rotor shaft. From this newly assumed orientation, by turning the rotor hub 106 adequately about its present vertical axis, the prospective axis of rotation 203 becomes parallel to an axis of rotation of the rotor shaft. The straight support surface section 216a rests on ground.

In the depicted embodiment, an auxiliary support frame 230 is provided under the base frame 211 to support the base frame 211 from ground, thus to prevent the turning stand 210 from rolling back and to maintain the turning stand 210 in the final position. The auxiliary support frame 230 in the depicted embodiment is formed of two beam structures 231 each provided in triangle configurations. The beam structures are stabilised by diagonal bracings 232. The auxiliary support frame 230 engages an abutment structure 211a of the base frame 211.

The abutment structure 211a in the shown embodiment is arranged adjacent to the proximate section 217 of the curved support frame and between the first and second curved support surface sections 215a and on a side of the base frame 211 facing ground in the orientation shown in FIG. 2B. The abutment structure 211a is formed to match an upper surface of the auxiliary support frame 230. In one embodiment, the abutment structure 211a is formed to receive a spigot of the auxiliary support frame 230. In another embodiment the abutment structure 211a only provides a blunt edge which is received in a recess in a top portion of the auxiliary support frame 230.

The auxiliary support frame 230 is adapted to be moved and placed under the base frame 211 in the final position by means of a fork lifter or a similar transport and lifting device. In further embodiments, the auxiliary support frame 230 may have wheels and may be pushed into position or, in further embodiments, may be self-propelled for positioning and removal. In other embodiments, the turning stand 210 and the rotor hub 106 are rolled off and then lifted onto the auxiliary support frame 230. In these embodiments, the auxiliary support frame 230 may even remain on its position and does not need to be mobile.

In alternative embodiments the auxiliary support frame 230 is hinged from the abutment structure 211a and is adapted to swing from a position between the first and second curved support surface sections 215a into its abutment position once the turning stand 210 is in rolled off.

In the position shown in FIG. 2B the turning stand 210 with the rotor hub 106 is either detached from the lifting device and stored on the turning stand 210 and the auxiliary support frame 230 until further use, or the lifting device remains attached to the second attachment structure 220 such that the rotor hub 106 is essentially suspended from the lifting device. As soon as the lifting device carries the weight of the rotor hub 106, the rotor shaft link 201 may be disengaged from the first attachment structure 212, such that the rotor hub is detached from the turning stand 210. After removing the rotor hub 106 from the turning stand 210, the rotor hub 106 is turned about its vertical axis until the prospective axis of rotation 203 of the rotor hub is parallel to the axis of rotation of the rotor shaft. The rotor hub 106 is further lifted into position for installation on the wind turbine rotor shaft as indicated by arrow 260. After the rotor hub 106 has been detached, the auxiliary support frame prevents that the turning stand 210 rolls back, which otherwise could cause damage to the rotor hub 106 and to operators and structures around the turning stand 210.

For example, the lifting device is a crane and the second attachment structure may essentially be adapted for engagement with a crane hook.

In the embodiment depicted in FIG. 2B, the base frame 211 is stabilised by diagonal bracings formed by intersecting cross beams 211b connecting diagonal corners of the oblong base frame 211.

FIGS. 3A to E show a process of turning the rotor hub 106 from a transport position to a final position, the final position having an orientation with respect to ground corresponding to the tilt angle of the rotor shaft of the wind turbine, and further removing the rotor hub 106 from the turning stand 210.

Figure 3A:
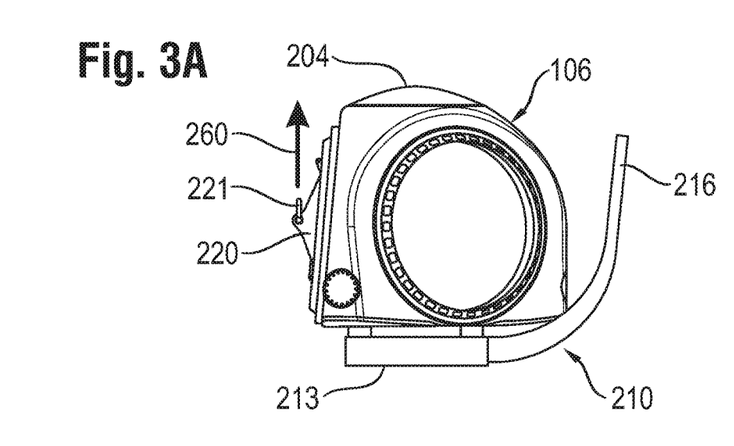
FIG. 3A shows a rotor hub provided in a turning stand according to the invention in a transport position.

In FIG. 3A, the rotor hub 106 is placed on the turning stand 210. To this end, a T-yoke is attached to the rotor hub 106 through a hole in the nose cone 204 and lifts the hub onto the turning stand 210. During placing the rotor hub 106 is oriented with its prospective axis of rotation 203 oriented vertically and its rotor shaft link 201 facing ground. The rotor hub 106 is placed on the first attachment structure 212 on the base frame 211 of the turning stand 210. Then, the rotor hub 106 is attached to the first attachment structure 212. In some embodiments the first attachment structure 212 has a surface corresponding to the attachment surface of a rotor shaft, such that the rotor shaft link 201 may be attached to the first attachment structure 212 in the same way as the rotor shaft link 201 is attached to a rotor shaft. However, in some embodiments a reduced set of attachment means is applied. For example, if the rotor shaft link 201 is adapted to be screwed to a rotor shaft, a reduced set of screws or screw holes is used, as the rotor shaft link 201 is only required to carry the load of the rotor hub 106, but not of any rotor blade.

The second attachment structure 220 is attached to one of the blade bearings 202 of the rotor hub 106. Attaching the second attachment structure 220 to the blade bearing 202 is principally carried out before or after the rotor hub 106 is attached to the first attachment structure 212.

The rotor hub 106 with the second attachment structure 220 is arranged on the turning stand 210 such that the second attachment structure 220 and the straight frame section 216 are on opposite sides of the rotor hub 106. After the first and second attachment structures 212, 220 are attached to the rotor hub 106, a lifting device is attached to the second attachment structure 220. The lifting device is, for example, a crane with a crane hook adapted for attachment to the second attachment structure 220. Thereto, the second attachment structure 220 comprises, in the depicted embodiment, a lifting device attachment means 221 such as a loop for attachment to the crane hook. After attachment to the second attachment structure 220, the lifting device lifts the second attachment structure 220 and the rotor hub 106 with the turning stand 210.

Figure 3B:
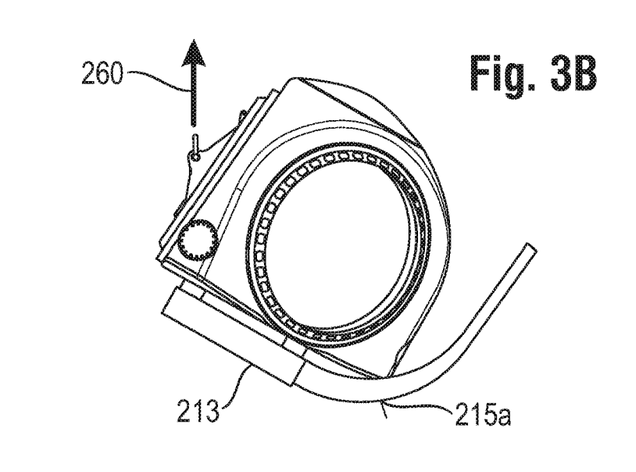
FIG. 3B shows a rotor hub in a turning stand according to the invention being lifted at an attachment structure and rolling off on a curved support surface.

FIG. 3B shows the rotor hub 106 with the turning stand 210 after the lifting device has lifted the second attachment structure 220 by a certain amount. While the turning stand 210 previously rested on ground on the support plane 213, the turning stand has started to roll off on the curved support surface section 215a of the curved support frame 214 due to lifting of the second attachment structure 220. Thus, while a part of the weight of the rotor hub 106 is carried by the lifting device, the remaining part of the weight is carried by the turning stand 210. The lifting device will continue lifting the second attachment structure 220 and the rotor hub 106 until the turning stand rests on its straight support surface section 216a of the straight frame section 216.

Figures 3C, 3D:
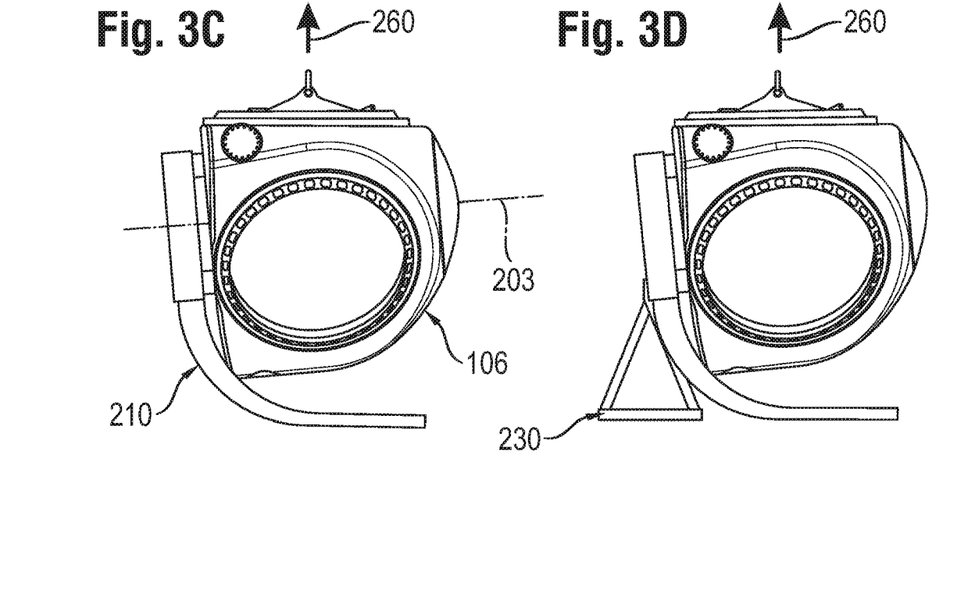
FIG. 3C shows the rotor hub and the turning stand according to the invention in a final position with the rotor hub being suspended to an attachment structure and supported by the turning stand.
FIG. 3D shows the rotor hub and the turning stand according to the invention in the final position with the turning stand being supported by an auxiliary support frame.

FIG. 3C shows the rotor hub 106 attached to the turning stand 210, with the turning stand 210 resting on the straight support surface section 216a. The angle of the straight support surface section 216a with respect to the prospective axis of rotation 203 of the rotor hub 106 corresponds to the tilt angle of the rotor shaft.

Depending on the position of the centre of gravity of the assembly of the turning stand 210 and the rotor hub 106 with respect to the straight support surface section 216a, the assembly remains stable in the shown position or tends to roll back to the initial position, if the lifting device is removed. Particularly, if the centre of gravity of the assembly is arranged perpendicularly over the area between the endings of the first and second straight support surface sections 216a, the assembly remains stable in the final position and does not roll back. If the centre of gravity of the assembly is arranged closer to the rotor shaft link 201 and the base frame 211, the assembly tends to roll back to rest on the base frame 211 and is required to remain supported by the lifting device to prevent such rolling back. If the centre of gravity of the assembly is arranged closer to the nose cone 204, the assembly has a tendency to tilt over the transverse bar 219.

FIG. 3D shows the assembly of the rotor hub 106 and the turning stand 210 in the final position and with the auxiliary support frame 230 supporting the base frame 211. The auxiliary support frame 230 prevents rolling back of the assembly, particularly, if the centre of gravity is close to the base frame 211. The auxiliary support frame 230 is positioned under the base frame as described above with reference to FIG. 2B. In order to arrange the auxiliary support frame 230, the assembly is rolled off into the final position. Then, the auxiliary support frame 230 is placed under the base frame 211. After placement, the assembly is allowed to slightly roll back in order to allow the abutment structure 211a of the turning stand 210 to engage the upper surface at the top portion of the auxiliary support frame 230. In other embodiments, the assembly is rolled off and then lifted onto the auxiliary support frame 230. In these embodiments, the auxiliary support frame 230 may even remain on its position and does not need to be mobile.

In this orientation, the assembly may be stored until the rotor 106 is removed from the turning stand 210 for installation at the wind turbine or to be put to further use. As the assembly is supported by the auxiliary support frame 230, the lifting device may be detached until it is needed again.

Figure 3E:
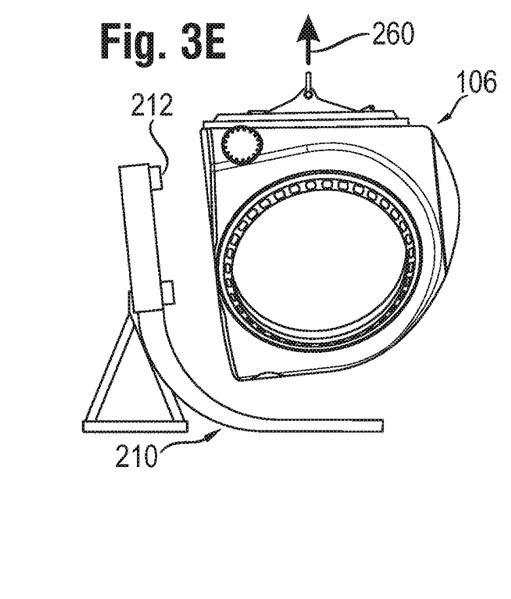
FIG. 3E shows a rotor hub suspended by an attachment structure and detached from the turning stand according to the invention.

FIG. 3E shows the rotor hub 106 detached from the turning stand 210 with the rotor hub 106 being suspended from a lifting device via the second attachment structure 220. The rotor hub 106 is now lifted into a position for attachment to the rotor shaft of the wind turbine 102. While the prospective axis of rotation 203 now has the same angle with respect to ground as the axis of rotation of the rotor shaft, the rotor hub 106 may still require to be turned about its new vertical axis until the prospective axis of rotation 203 of the rotor hub 106 is oriented in parallel to the axis of rotation of the rotor shaft. The rotor hub 106 may then be brought into its installation position to allow attachment of the rotor hub 106 to the rotor shaft. In the installation position, the prospective axis of rotation 203 of the rotor hub 106 is aligned with the axis of rotation of the rotor shaft, in so far that deviations can be compensated during attachment of the rotor hub 106 to the rotor shaft.

The second attachment structure 220 is adapted to suspend the rotor hub 106 with the prospective axis of rotation 203 maintaining the angle with respect to ground corresponding to the tilt angle of the axis of rotation of the rotor shaft. In some embodiments, the lifting device attachment means 221 of the second attachment structure 220 is positioned, when attached to the rotor hub 106, such that a connecting line to the centre of gravity of the rotor hub 106 is angled with respect to an orthogonal line to the prospective axis of rotation 203 by the tilt angle of the rotor shaft with respect to ground. In some embodiments, the lifting device attachment means 221 is arranged non-relocatable in this position on the second attachment means. In other embodiments the lifting device attachment means 221 is adapted to be shifted in parallel to the prospective axis of rotation 203, particularly to adapt to different rotor hubs. As the angle of the prospective axis of rotation 203 is ultimately determined by the position of the lifting device attachment means 221, the arrangement of the straight support surface section 216a with respect to the prospective axis of rotation 203 particularly serves to avoid deflection of the rotor hub 106 immediately after detachment from the turning stand 210.

In some embodiments, the lifting device for rolling off the rotor hub 106 on the turning stand 210 is the same lifting device as for lifting the rotor hub 106 to the position for attachment to the rotor shaft after detachment from the turning stand 210, in other embodiments it is different. In these embodiments, a smaller lifting device, such as a small crane or a fork lifter, rolls off the rotor hub 106, and a larger lifting device, such as a large crane, lifts the rotor hub 106 to the attachment position.

While the invention has been described by reference to turning the rotor hub from a transport position to a position oriented in preparation for attachment to a rotor shaft of a wind turbine, the turning stand may also be used for rotating the rotor hub in a factory whenever needed during manufacture, assembly, testing or other operations.

REFERENCE SIGNS 102 wind turbine
104 nacelle
106 rotor hub
108 wind turbine tower
110 rotor blades
201 rotor shaft link
202 blade bearing
203 prospective axis of rotation
204 nose cone
210 turning stand
211 base frame
211a abutment structure
211b diagonal bracing
212 first attachment structure
213 support plane
214 curved support frame
215 curved frame section
215a curved support surface section
216 straight frame section
216a straight support surface section
217 proximate section
218 distal section
219 transverse bar
220 second attachment structure
221 lifting device attachment means
230 auxiliary support frame
231 triangle beam
232 diagonal bracing
250 turning arrow
260 lifting arrow

The invention claimed is:

1. A turning stand for turning a rotor hub from a position having its prospective axis of rotation oriented vertically to a position having its prospective axis of rotation oriented inclined or transversally to a vertical orientation, comprising:
- a base frame having a support plane and a first attachment structure for attachment to a rotor shaft link of the rotor hub, the first attachment structure being arranged to be aligned to the prospective axis of rotation of the rotor hub and the support plane being arranged to extend perpendicularly to the prospective axis of rotation of the rotor hub;
- a curved support frame comprising a curved frame section and a straight frame section having a curved support surface section and a straight support surface section, respectively; and
- a second attachment structure for attachment of a lifting device to the rotor hub;
- wherein the straight frame section with the straight support surface section is arranged to be lateral of the prospective axis of rotation of the rotor hub and the straight support surface section is oriented in a non-zero angle to the support plane;
- wherein the curved frame section is connected between the base frame and the straight frame section, such that the curved support surface section curves from the support plane to the straight support surface section;
- wherein the second attachment structure is adapted to be arranged laterally to the prospective axis of rotation of the rotor hub and is arranged on an opposite side of the position for the rotor hub with respect to the straight frame section,
- wherein the curved support frame has a first curved support surface section, a first straight support surface section, a second curved support surface section and a second straight support surface section;
- the first and second curved support surface sections abut the first and second straight support surface sections, respectively;
- the first curved support surface section and the first straight support surface section extend in parallel to the second curved support surface section and the second straight support surface section, respectively; and
- the first curved support surface section and the first straight support surface section are spaced apart from the second curved support surface section and the second straight support surface section, respectively, such that an outer edge of the first curved support surface section and an outer edge of the second curved support surface section are spaced apart by a width of a side of the base frame, from which side the curved support frame extends.

2. The turning stand according to claim 1, wherein the curved support surface section abuts flush with the support plane and the straight support surface section, respectively.

3. The turning stand according to claim 1, further comprising an abutment structure for an auxiliary support frame, the abutment structure being arranged adjacent to an interface between the base frame and the curved frame section.

4. The turning stand according to claim 1, wherein the second attachment structure is adapted to engage a blade bearing of the rotor hub.

5. The turning stand according to claim 1, wherein the first and second straight support surface sections are connected by a transverse bar.

6. The turning stand according to claim 1, wherein the second attachment structure comprises a lifting device attachment means, which is adapted to be positioned, when attached to a rotor hub, such that a connecting line to a centre of gravity of the rotor hub is angled with respect to an orthogonal line to the prospective axis of rotation of the rotor hub by less than 15°.

7. The turning stand according to claim 1, wherein the straight support surface section is oriented to the support plane by an angle equal to a sum of a tilt angle and a right angle.

8. A method for turning a rotor hub from a transport position having its prospective axis of rotation oriented vertically to a position having its prospective axis of rotation oriented inclined or transversally to a vertical orientation, the method comprising:
- providing a rotor hub in a turning stand according to claim 1 with a rotor shaft link of the rotor hub being attached to the first attachment structure, the turning stand and the rotor hub being in the transport position with the base frame below the rotor hub;
- attaching the second attachment structure to the rotor hub;
- attaching a lifting device to the second attachment structure; and
- lifting the second attachment structure, thereby rolling off the rotor hub on the curved support surface section until the prospective axis of rotation of the rotor hub is oriented inclined or transversally to a vertical orientation.

9. The method according to claim 8, comprising placing the rotor hub on the turning stand, attaching the first attachment structure to the rotor shaft link of the rotor hub and transporting the rotor hub and the turning stand to an erection site of a wind turbine.

10. The method according to claim 8, further comprising, after rolling off the rotor hub on the curved support surface, disposing an auxiliary support frame under an abutment structure of the base frame in order to prevent the turning stand from rolling back.

11. The method according to claim 8, further comprising detaching the rotor hub from the base frame and lifting the rotor hub by means of the lifting device into an attachment position.

12. A method for erecting a wind turbine comprising turning a rotor hub according to claim 8.

* * * * *